United States Patent

[11] 3,542,264

| [72] | Inventors | Engelbert A. Meyer |
| | | Union Lake; |
| | | Donald J. Reid, Pleasant Ridge, Michigan |
| [21] | Appl. No. | 725,375 |
| [22] | Filed | April 30, 1968 |
| [45] | Patented | Nov. 24, 1970 |
| [73] | Assignee | Warren Fastener Corporation |
| | | Clemens, Michigan |
| | | a corproation of Michigan |

[54] COMBINATION TRIM AND CARRIERS
3 Claims, 8 Drawing Figs.

[52] U.S. Cl. .................................................. 224/42.34,
105/381, 105/387, 224/42.1; 280/179; 293/1
[51] Int. Cl. ..................................................... B60r 9/00
[50] Field of Search ........................................... 224/42.1A,
42.1D, 42.1F, 42.1E, 42.1G, 29, 43, 34; D14/27.3;
293/1, 54D; 296/43; 280/164; 105/382, 381, 387,
389, 384

[56] References Cited
UNITED STATES PATENTS

| 1,530,743 | 3/1925 | West ............................ | 224/42.34X |
| 1,532,756 | 4/1925 | Kaufman ...................... | 224/42.34X |
| 1,650,451 | 11/1927 | Kelly et al. .................... | 280/164 |
| 1,887,653 | 11/1932 | Lonschein .................... | 280/164 |
| 2,114,707 | 4/1938 | Fitch et al. .................... | 105/382UX |
| 2,355,867 | 8/1944 | Jarvis ............................ | 105/382 |
| 1,613,077 | 1/1927 | Boyrgon ...................... | 293/54DUX |
| 1,972,283 | 9/1934 | Zimmers ...................... | 293/54DUX |
| 2,844,291 | 7/1958 | McPheeters .................. | 224/42.1(G) |
| 3,165,353 | 1/1965 | Weise .......................... | 224/42.1(F)X |

*Primary Examiner*—Gerald M. Forlenza
*Attorneys*—W. Bigelow Hall, Richard A. Wise and Scott R. Foster

ABSTRACT: A trim member for attachment to automotive vehicles and the like, the trim member comprising movable trim means which may be positioned in such a manner as to convert the trim to carrier means or, alternatively, to a support on which various carriers may be mounted.

Patented Nov. 24, 1970

Inventors
Engelbert A. Meyer
Donald J. Reid
By their Attorney

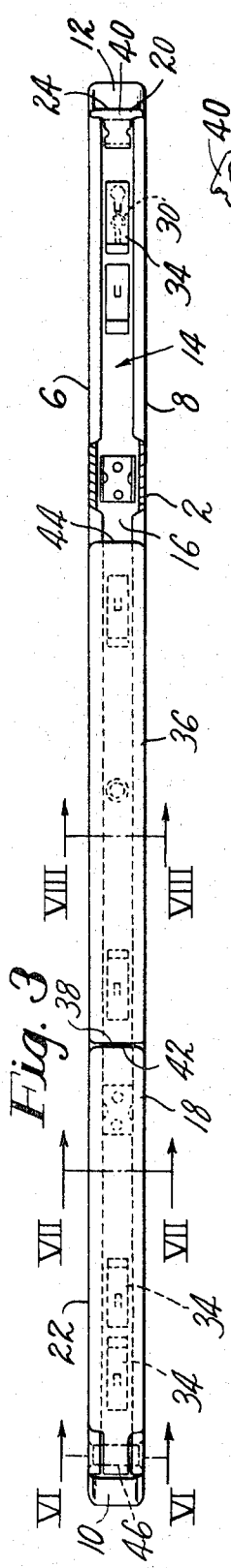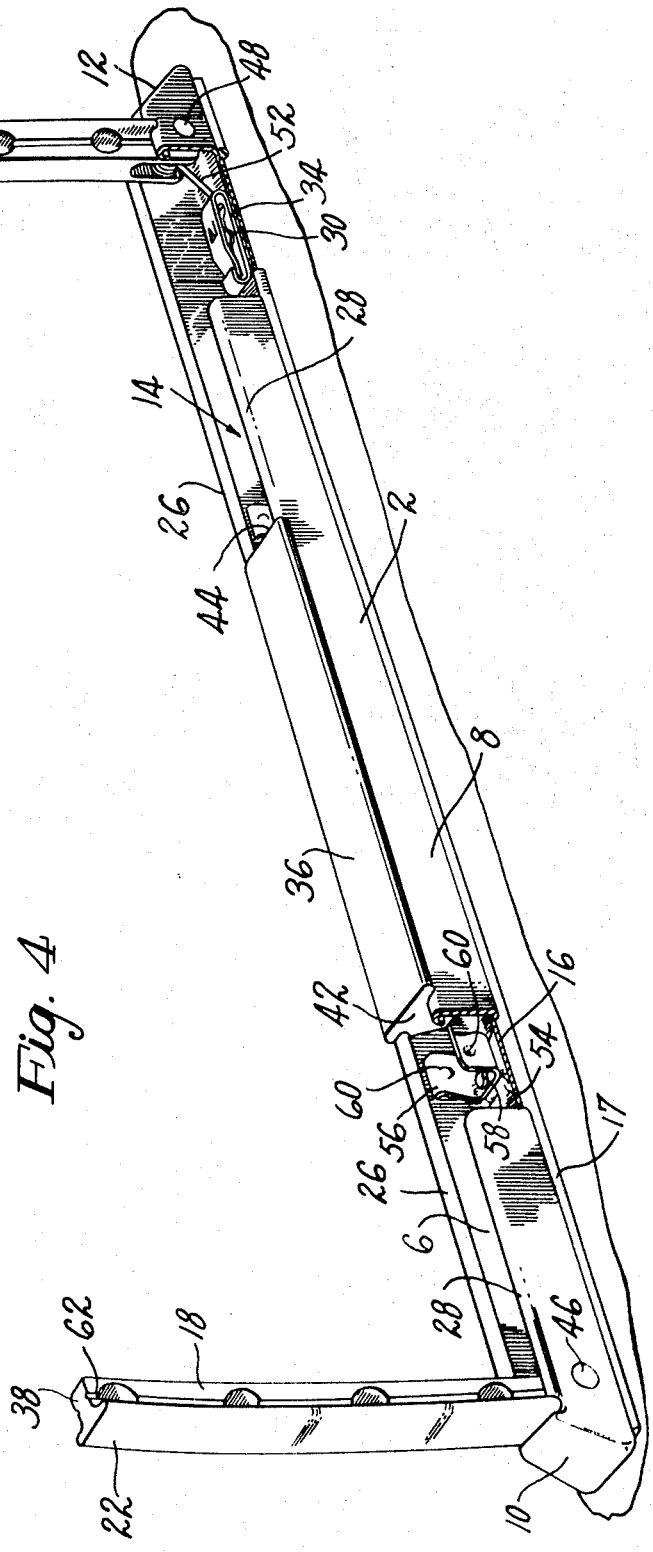

3,542,264

COMBINATION TRIM AND CARRIERS

BACKGROUND OF THE INVENTION

1. Field of the Invention

This invention relates to trim members for use on automotive vehicles, trailers, and the like, and is directed more particularly to trim having the facility for conversion to carrier means.

The invention is herein illustrated in connection with trim for automobiles. It will be understood, however, that other environments might be employed in connection with the invention, as for example, trailers, boats, motor scooters, and household appliances, as for example washing machines, drying machines, and the like.

2. Description of the Prior Art

While the use of trim members on automobiles, as well as other vehicles and appliances, is well known, it will be appreciated that heretofore the trim has served very little functional purpose other than occasionally serving to protect a painted surface or cover an otherwise unattractive area or seam. Thus, while the use of trim is well known, it has generally been used for purely aesthetic purposes, i,e., to enhance the appearance of the support on which it is mounted.

In the automotive field, trim has seldom been used on automobile roof tops and trunk lids because of the necessity of destroying the weatherproof integrity of the roof or trunk lid in order to attach trim members thereto.

The use of luggage carriers on automobile roof tops and trunk lids is now commonplace. However, the carriers presently in use are generally not permanently attached to the automobile, but are secured by suction cups in combination with various straps and wires which generally result in a rather unsightly appearance, as well as some difficulty in attaching and removing the carriers. While some models of automobiles are provided with permanent luggage racks, such provision is usually made at the factory and the owners of such automobiles must be content with having the luggage rack attached to the car at all times, whether or not the rack is needed.

SUMMARY OF THE INVENTION

It is an object of the present invention to provide trim members which may be attached to roof tops and trunk lids of automobiles without violating the weatherproof characteristics of those surfaces.

It is a further object of the invention to provide such trim members having facility for conversion to cargo carrying means, or alternatively, to support means on which cargo carrying means may be mounted.

With the above and other objects in view, as will hereinafter appear, a feature of the present invention is the provision in a trim member of movable parts which may be positioned to project upwardly from the surface on which the trim member is secured, whereby to afford means for retaining cargo or, if preferred, to provide mounting means for retaining separate cargo carrying means.

The above and other features of the invention, including various novel details of construction and combinations of parts, will now be more particularly described with reference to the accompanying drawings and pointed out in the claims. It will be understood that the particular device embodying the invention is shown by way of illustration only and not as a limitation of the invention. The principles and features of this invention may be employed in various and numerous embodiments without departing from the scope of the invention.

BRIEF DESCRIPTION OF THE DRAWINGS

Reference is made to the accompanying drawings in which there is shown an illustrative embodiment of the invention from which its novel features and advantages will be apparent.

FIG. 3 is a plan view of the trim member shown in FIG. 2;

FIG. 4 is a perspective view, partly cut away, of the trim member shown in FIGS. 2 and 3;

DESCRIPTION OF THE PREFERRED EMBODIMENT

Figure 1:
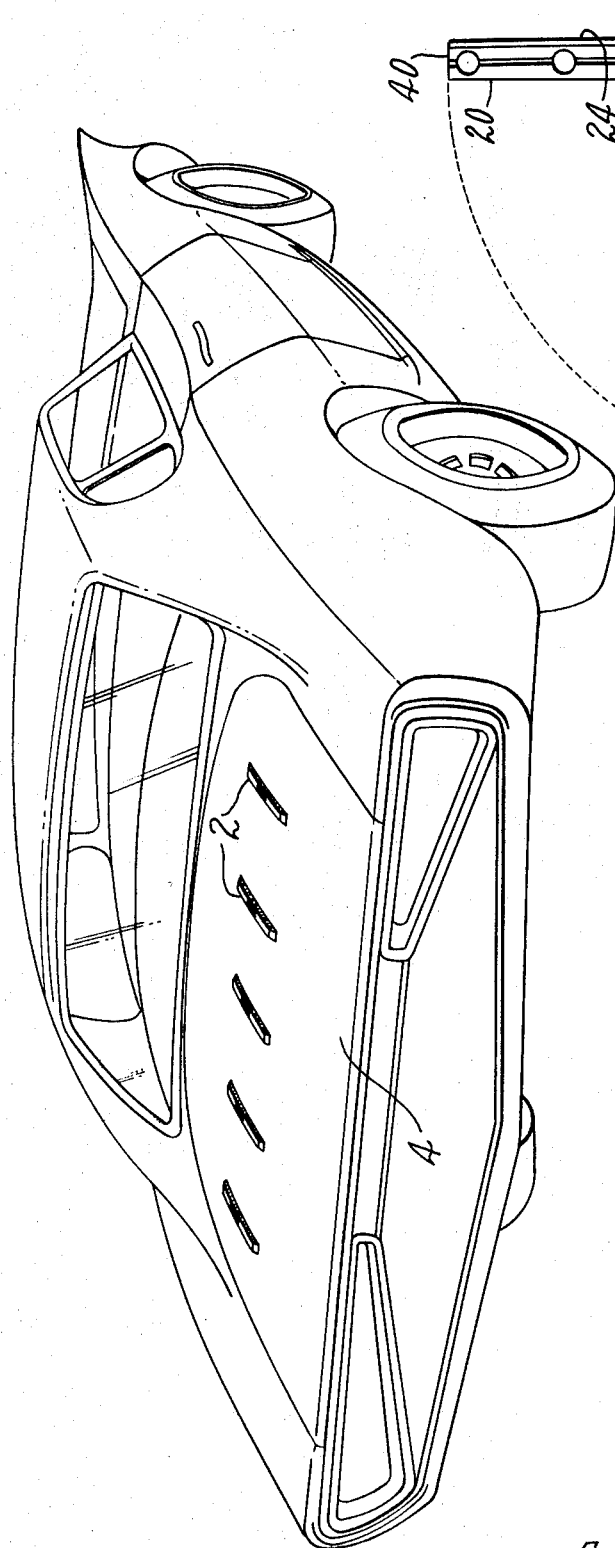
FIG. 1 is a perspective view of an automobile having mounted thereon several trim members illustrative of an embodiment of the invention.

Referring to FIG. 1, it may be seen that the illustrative trim piece comprises an elongated member 2 attached to a support 4, as for example the trunk lid of an automobile.

Referring to FIGS. 2 through 5, it may be seen that the trim member 2 comprises side walls 6, 8 and end walls 10, 12 which define an elongated channel 14. The trim member also includes a bottom portion 16 which is mounted on the support 4 to which the trim is attached, or alternatively, mounted on a gasket member 17 disposed between the support 4 and trim member 2.

Figure 2:
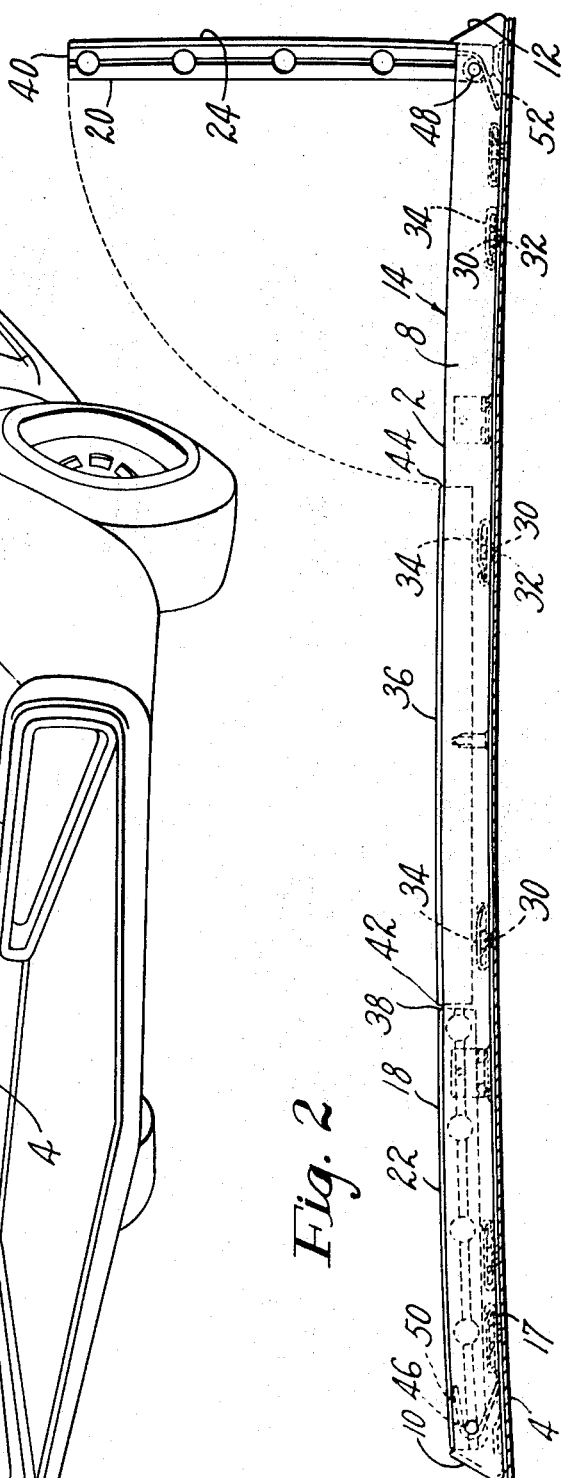
FIG. 2 is an elevational view of one trim member shown in FIG. 1.
Figure 5:
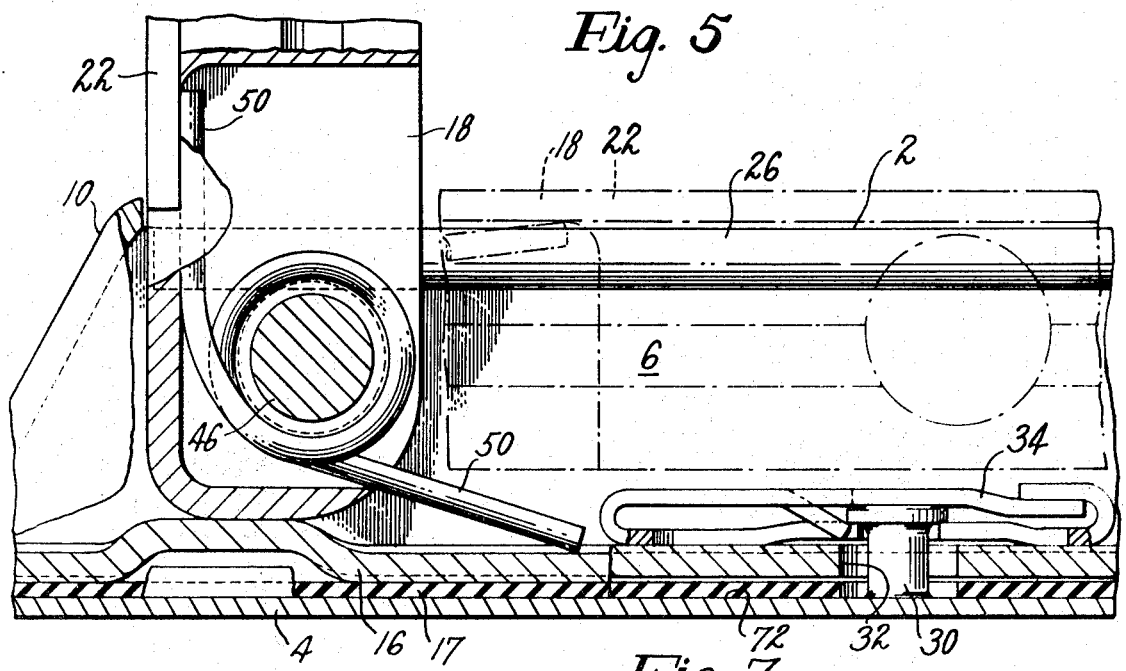
FIG. 5 is an enlarged detailed view, partly in section and partly cut away, of an end portion of a trim member.

Disposed within the channel 14 is a pair of movable trim members 18, 20, each pivotally connected at one end to the elongated trim member 2 proximate to the end walls 10, 12. The movable trim members are pivotally movable from a first position in which they are disposed in the channel 14, as illustrated by the member 18 in FIG. 2, to a second position in which the movable members are upstanding from the trim member, as illustrated in FIGS. 2—4 where the movable member 20 is shown in the upstanding position (FIG. 4 showing both members 18, 20 in the upstanding position). The movable members 18, 20 are provided with cover portions 22, 24, respectively, which, when the members 18, 20 are in the first position in the channel 14, serve to cover edges 26, 28 of the side walls 6, 8 of the trim piece, which edges may be rolled, as illustrated, for safety purposes and to present a more pleasing appearance when the movable members are in the raised position.

Referring still to FIGS. 2—5, it may be seen that to facilitate mounting of the trim member 2 the support member 4 is provided with a series of headed studs 30 which are received in openings 32 in the bottom portion 16 of the trim member 2 as well as corresponding openings in the gasket member 17. A clip member 34 may be used in combination with each stud 30 to secure the trim member 2 to the support 4.

A decorative member 36 may be disposed in the channel 14 and should be of such length that when the movable members 18, 20 are in the first position, i.e., in the channel 14, the free ends 38, 40 of the members 18, 20 are adjacent the ends 42, 44 respectively of the decorative member 36 so that when the members 18, 20 are in the first position a clean substantially unbroken top surface is in view, as illustrated in FIG. 1.

Figure 6:
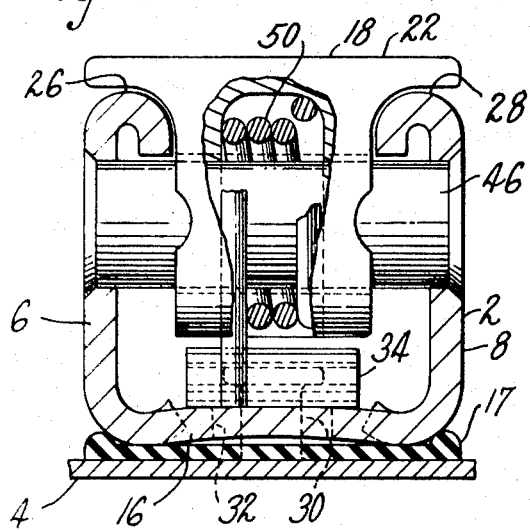
FIG. 6 is a sectional view, taken along the line VI—VI of FIG. 3.

The movable members 18, 20 may be secured to the trim member 2 by way of pivot pins 46, 48 mounted at either end of the channel 14 in the walls 6, 8. Spring members 50, 52 may be disposed about the pivot pins 46, 48, respectively, (FIGS. 5 and 6) in order to tension the movable members 18, 20 in the upstanding position.

Figure 7:
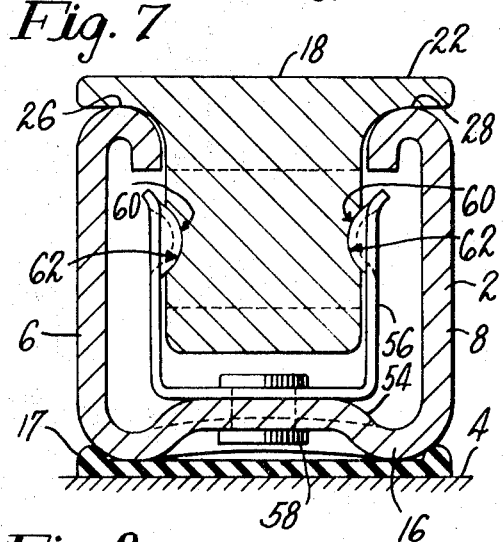
FIG. 7 is a sectional view, taken along line VII—VII of FIG. 3.

Referring to FIGS. 4 and 7, it will be seen that the bottom portion 16 of the trim member 2 may be provided with raised portions 54 to which are attached U-shaped spring clips 56, as by connecting pins 58. The clips 56 are provided with detents 60 shaped complementarily to grooves 62 in the movable members 18, 20, the detents 60 being engageable with the grooves 62. The spring clips 56 exercise sufficient force on the movable members to insure their retention in the channel 14 against the pressure of the springs 50, 52 when it is desired that the movable members be disposed in the first position, i.e., in the channel.

Figure 8:
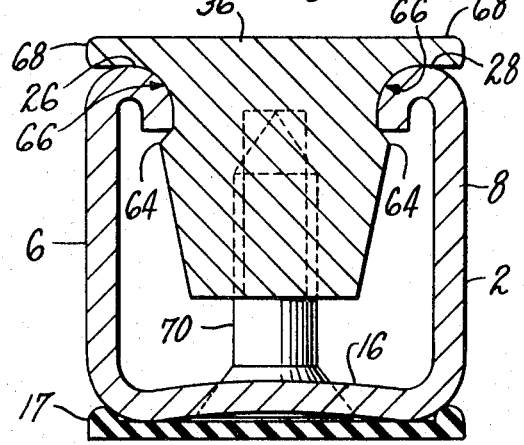
FIG. 8 is a sectional view, taken along line VIII—VIII of FIG. 3.

The decorative member 36 may be shaped in such a manner that the trim member walls 6, 8 operate to retain the decorative member in place, as shown in FIG. 8. In the illustrative example the decorative member is provided with shoulders 64 having a transverse dimension greater than the transverse distance between the opposed rolled-over edges of the walls 6, 8. The rolled-over edges of the walls are engageable with complementarily shaped grooves 66 in the decorative member, the grooves being defined in part by the shoulders 64 and a cover portion 68. Thus, the decorative member may be pressed into the channel 14 and held in place by the spring action of the trim member walls. If desired, the decorative member may be permanently attached to the trim member 2 by means of a screw 70 or like fastener.

Referring again to FIG. 5, it will be seen that the studs 30 are secured to only the outside surface 72 of the support 4. Being secured to the surface 72, as opposed to extending through the support 4 to be clamped thereto, the support 4 is left inviolate whereby to retain its waterproof characteristics. The studs 30 may be attached to the support 4 by any suitable means, but preferably means not requiring a hole in the support 4, as for example by adhesive means or, as is preferred, welding means.

Thus, in attaching the trim of the present invention to the support 4, the studs are first affixed to the support surface 72, as by welding, the gasket member 17 and trim member 2 placed thereover, and the clip members 34 disposed about the studs to retain the trim in place. Accordingly, the trim may be used on vehicle roof tops and trunk lids without sacrificing important weatherproof features. This feature also permits the trim of the present invention to be used with household appliances, such as refrigerators, freezers, washing machines, and the like, without violating the integrity of the container.

In operation, the movable members are normally in the first position where they are securely held in place by the clip members 56. The cover portions 22, 24 of the movable members and the cover portion 68 of the decorative member present a pleasing, substantially unbroken surface to view. The trim member may be of aluminum or may be chrome plated, in the manner of ordinary trim members. The decorative member may be of like material or may be of plastic or other material for a contrasting effect. If plastic, various colors may be used to best enhance the over-all appearance of the vehicle or other support.

When it is desired to convert the trim means to carrier means, an operator merely raises the movable members to the second position. After pulling the movable members free of the U-shaped spring clips, the spring members 50, 52 urge the movable members to the upstanding position and tension the movable members in such position. When a sufficient number of the movable members are in the position shown with respect to the member 20 in FIG. 2, cargo may be placed within the area bounded by the upstanding members or, alternatively, a particular carrier device may be adapted to fit onto the upstanding members. Thus, the upstanding members may receive and have attached thereto carrier devices to accommodate skis, luggage, lumber, plate glass, or any number of specialized cargos.

Upon completion of the cargo carrying chore, the operator merely removes the carrier attachment, if one has been used, and presses the movable members back into the channel of the trim member, whereby to remove the carrier means from sight by converting it to aesthetically pleasing trim means.

While the above description has for illustrative purposes by and large referred to the present invention in combination with automotive support means, it will be apparent that the invention finds application in other areas as well. For example, trim of the nature herein described is suitable for use in household appliances such as washing machines where a trim member may easily be converted to a laundry basket holder, or in conjunction with refrigerators or freezers where a trim member may be conveniently converted to a market basket holder, or bag holder, and subsequently converted back to trim whereby to require as little space as possible in a home laundry room, kitchen, and the like.

In boating, such trim members may be used to facilitate the temporary attachment of ski tow devices, ladders, or fishing equipment, and conveniently returned to trim status when desired.

It will be understood that the trim assembly may comprise two spaced angularly movable members 18, 20, and merely a single such member in a single frame or trim member 2, i.e. the lower member, articulated to load-retaining position. The latter arrangement would be more likely to be employed where the support 4 is inclined at least 30° to the horizontal as shown in FIG. 2 and a single member is rotatable in a vertical plane.

Having thus described our invention; what we claim as new and desire to secure by Letters Patent of the United States is:

We claim:

1. Trim assembly convertible from linear support form to carrier means and vice-versa said trim assembly comprising a relatively stationary elongated trim member of generally U-shaped cross section, with side walls forming a channel, and having its bottom adapted to be secured to a supporting surface, and trim means movably connected to said elongated trim member, said movable trim means being generally T-shaped in section and pivotally mounted in an end of said channel to be movable independently of said elongated trim member from a first position generally parallel to said elongated member to a second position generally normal to said elongated member, said channel receiving the entire length of said trim means when said trim means is disposed in said first position to close said channel, and in which the cross portion of said T-shaped section of the movable trim member forms a cover which overlaps the top edges of the channel walls.

2. Trim assembly in combination with support means and convertible to carrier means, comprising stud members fixed to said support means, a trim member having parallel elongated side walls and a connecting apertured bottom portion adapted to be connected to said stud members, spring clips secured to the stud members adjacent said bottom portion, and movable trim means connected to said trim member and of a width to cover said side walls when enclosing said studs in the trim member, said trim means being movable from a first position in which a free end of said trim means is releasably retained by one of said spring clips and engages said trim member to a second position in which said free end of said trim means extends upwardly from said trim member, whereby to convert said trim to carrier means.

3. The invention according to claim 2 in which said trim member houses adjacent to its bottom portion stud-engaging clips providing detachable means for interconnecting said trim member and said stud members whereby removably to affix said trim member to said support means.